United States Patent [19]

Kaneko et al.

[11] Patent Number: 5,720,861
[45] Date of Patent: Feb. 24, 1998

[54] MAGNETIC RECORDING MEDIUM

[75] Inventors: Hideo Kaneko; Katsushi Tokunaga; Yoshio Tawara, all of Kanagawa-ken, Japan

[73] Assignee: Shin-Etsu Chemical Co., Ltd., Tokyo, Japan

[21] Appl. No.: 516,046

[22] Filed: Aug. 17, 1995

[30] Foreign Application Priority Data

Sep. 13, 1994 [JP] Japan ..................... 6-218893
Oct. 14, 1994 [JP] Japan ..................... 6-248989

[51] Int. Cl.$^6$ ..................... C23C 14/34
[52] U.S. Cl. ............ 204/192.2; 204/192.15; 204/192.3
[58] Field of Search ............ 204/192.15, 192.2, 204/192.3

[56] References Cited

U.S. PATENT DOCUMENTS 4,529,621  7/1985  Ballard ............ 204/192.2 X

FOREIGN PATENT DOCUMENTS 0574835  12/1993  European Pat. Off. .

*Primary Examiner*—Nam Nguyen
*Attorney, Agent, or Firm*—McAulay Fisher Nissen Goldberg & Kiel, LLP

[57] ABSTRACT

An improvement is proposed in the method for the preparation of a magnetic recording medium comprising a non-magnetic substrate plate of silicon and a magnetic recording layer formed on the substrate surface by the method of bias-sputtering, by which the magnetic recording layer can be imparted with an unexpectedly large coercive force. The improvement can be accomplished by the use of a silicon substrate plate which has a volume resistivity not exceeding 2 ohm-cm at room temperature. The improvement is more remarkable when the contact resistance between the silicon substrate plate and the substrate holder is kept not to exceed 10 kohm during the bias-sputtering for the formation of the magnetic recording layer on the substrate surface.

4 Claims, No Drawings

MAGNETIC RECORDING MEDIUM

BACKGROUND OF THE INVENTION

The present invention relates to a magnetic recording medium or, more particularly, relates to a magnetic recording medium of the type consisting of a non-magnetic substrate plate and a ferromagnetic recording layer formed on at least one surface of the non-magnetic substrate plate by a dry-process method. Still more particularly, the invention relates to an improvement in the method for the preparation of a magnetic recording medium of the above mentioned type of which the non-magnetic substrate plate is made from silicon and which is useful as an external memory device in computes or, in particular, as a magnetic hard disc memory.

Along with the rapid progress of information-predominant or computerized society in recent years, one of the key factors to support the progress is the availability of information-recording media of very high capacity. In particular, magnetic recording discs, which play a core role as an external memory device of computers, are now under continued improvement year by year toward an increase for both of the recording capacity and recording density to ensure still improved recording performance of the recording media. This requirement for a high recording density in a magnetic recording medium is more important than heretofore due to the outstanding trend toward higher and higher compactness of computers such as notebook-type personal computers and palm-top personal computers.

Among the various properties which have influences on the recording characteristics of a magnetic recording medium, the non-magnetic substrate plate has a predominantly ruling effect on the mechanical strength, smoothness of the surface, warping, weight and the like of a magnetic recording medium. The most conventional material for the non-magnetic substrate plate of magnetic recording media in the prior art is an aluminum-based alloy and the substrate plate is provided with a plating layer of NiP as an undercoating of the magnetic recording layer. Substrate plates of such an aluminum alloy in general have several problems and disadvantages due to the low hardness or rigidity of the material. For example, the thickness of the substrate plate cannot be small enough as desirable and deformation is caused by impact during handling due to the low rigidity of the alloy and scratches are sometimes formed on the surface of the substrate plate during handling due to the low hardness.

As an alternative of the substrate plate made from an aluminum-based alloy, proposals have been made for the use of a disc or wafer of a single crystal silicon in Japanese Patent Publications 1-42048, 2-41089, 2-59523 and 1-45140, Japanese Patent Kokai 6-68463, 6-28655 and 4-259908 and elsewhere. For example, Japanese Patent Publication 2-41089 teaches the use of a semiconductor-grade single crystal silicon wafer as the substrate of a magnetic recording medium, on which an undercoating layer is first formed and then a magnetic recording layer is formed thereon from a ferromagnetic metallic material consisting of iron, cobalt and the like. Japanese Patent Publication 2-59523 proposes a method according to which the surface of a substrate plate of silicon is provided with numberless microscopic protrusions and cavities before formation of the magnetic recording layer by coating with a magnetic coating composition. This method is not always quite satisfactory because the flying height of the magnetic head, i.e. the distance between the surface of the magnetic recording medium and the magnetic head held above the surface during recording and playing-back of signals, cannot be small enough, which should desirably be 0.1 μm or even smaller, due to the existence of the protrusions on the substrate surface if not to mention the disadvantage that the process for the formation of such protrusions is very complicated. On the other hand, Japanese Patent Kokai 4-259908 teaches that the CSS characteristic of a magnetic recording medium, which is degraded by too high smoothness of the substrate surface, can be improved by providing the substrate surface with a concentrically circular texturing.

It is a trend in recent years in the process of formation of a magnetic recording layer on the surface of a substrate plate that the traditional wet-process method by coating with a coating composition containing ferromagnetic fine particles or by electrolytic plating is replaced with the dry-process method such as the method of sputtering in order to comply with the requirement for the magnetic recording layer having a smaller and smaller thickness. In view of the fact that the coercive force of the ferromagnetic material forming the magnetic recording layer must be as high as possible in order to comply with the requirement for high-density recording, several proposals and attempts have been made heretofore. For example, an underlayer of chromium or a chromium alloy is provided between the substrate surface and the magnetic recording layer or the process of sputtering for the formation of the magnetic recording layer is performed on the surface of a substrate heated at an elevated temperature of, for example, 250° C. to 300 ° C. These methods, however, are not always quite satisfactory. For example, the coercive force of a magnetic recording layer, which is formed by the method of DC sputtering or RF sputtering on the surface of a silicon substrate from a cobalt-chromium-tantalum alloy as a conventional ferromagnetic material, can rarely exceed 1000 Oe to 1300 Oe when the easy-magnetization axis lies within the plane of the substrate surface even by providing an underlayer of chromium between the substrate surface and the magnetic recording layer. Increase of the temperature of substrate during the sputtering process is effective for the improvement of the coercive force of the magnetic recording layer but a phase change is induced in the cobalt-based magnetic alloy when the temperature is too high resulting in a decrease in the coercive force.

It is also known for a substrate plate of an aluminum alloy that the coercive force of the magnetic recording layer formed thereon by the sputtering method can be improved by conducting the sputtering as the so-called bias-sputtering method in which the substrate plate is kept at a negative potential relative to the ground or the body of the sputtering chamber per se as is taught in Japanese Patent Publication 5-72015. In conducting the above mentioned bias-sputtering, the electric conductivity or volume resistivity of the substrate material is of no particular matter at least in the substrate plates of aluminum alloys in order to accomplish the desired improvement in the coercive force of the magnetic recording layer by keeping the substrate plate at a negative potential because the bias current passing through the substrate during bias-sputtering is very small.

As to the electric conductivity or volume resistivity of silicon as an alternative material for the substrate plate of magnetic recording media, it is known that high-purity silicon as an intrinsic semiconductor has a volume resistivity of $230 \times 10^3$ ohm.cm at room temperature. It is also well known that the volume resistivity of a silicon semiconductor is greatly decreased by doping with a dopant such as boron, phosphorus and the like to be around 10 ohm.cm in the conventional silicon semiconductors of P-type or N-type used in the manufacture of semiconductor devices. Different from the substrate plates of an aluminum alloy, no substantial improvement can be obtained in the coercive force of the magnetic recording layer formed on a substrate of silicon by the method of bias-sputtering in a conventional sputtering apparatus for piece-by-piece processing or transfer processing for mass production when the silicon substrate is a semiconductor-grade single crystal silicon wafer having a volume resistivity of around 10 ohm.cm as selected in view of the good availability.

Accordingly, it is eagerly desired to develop a means for the improvement of the coercive force of the magnetic recording layer of a magnetic recording medium formed by the method of bias-sputtering on the surface of a substrate plate which is a wafer of silicon.

SUMMARY OF THE INVENTION

The present invention accordingly has an object to provide a novel and improved means for the improvement of the coercive force of the magnetic recording layer of a magnetic recording medium formed by the method of bias-sputtering on the surface of a substrate plate which is a wafer of silicon.

Thus, the present invention provides an improvement which comprises, in a method for the preparation of a magnetic recording medium comprising a non-magnetic substrate plate of silicon and a magnetic recording layer of a ferromagnetic material formed by the method of bias-sputtering on at least one flat surface of the substrate plate held by a substrate holder in a sputtering chamber, the improvement comprising using a substrate plate of silicon of which the volume resistivity does not exceed 2 ohm.cm or, preferably, 0.2 ohm.cm or, more preferably, 0.02 ohm.cm at room temperature.

The improvement accomplished by the above described method can be further enhanced by keeping the contact resistance between the substrate plate and the substrate holder not to exceed 10 kohm or, preferably, not to exceed 1 kohm or, more preferably, not to exceed 100 ohm during the process of bias-sputtering for the formation of the magnetic recording layer.

DETAILED DESCRIPTION OF THE PREFERRED EMBODIMENTS

As is described above, the most characteristic feature of the method according to the present invention consists in the use of a specific substrate plate of silicon which has a volume resistivity not exceeding 2 ohm-cm or, preferably, 0.2 ohm.cm or, more preferably, 0.02 ohm.cm at room temperature. By this means, the coercive force of the magnetic recording layer formed thereon by the method of bias-sputtering can be as high as 1600 Oe or even higher. When a silicon substrate having a volume resistivity exceeding 2 ohm-cm is used, in contrast thereto, the coercive force of the magnetic recording layer formed thereon can hardly exceed 1300 Oe.

Silicon substrate plates having a low volume resistivity as mentioned above can be prepared by the method of doping of silicon with a dopant material which can be any of conventional dopant materials such as boron, phosphorus, arsenic, antimony and the like. The desired improvement in the inventive method can be obtained provided that the volume resistivity of the silicon substrate does not exceed the above defined upper limit irrespective of the type of the conductivity which may be P-type or N-type depending on the kind of the dopant. The method for doping of silicon is not particularly limitative and can be performed either before, during or after preparation of the single crystal rod of silicon from which the substrate plates are prepared by slicing. Most conveniently and reliably, however, doping of silicon is conducted by adding the dopant material into the melt of silicon contained in a fused silica glass crucible from which a single crystal silicon rod is grown by the Czochralski method. Needless to say, the volume resistivity of doped silicon can be further decreased by increasing the amount of the dopant introduced into the melt of silicon although the amount of the dopant is under a limitation because no solid solution can be formed between silicon and a too large amount of the dopant to cause appearance of another crystalline phase resulting in a disordered crystalline structure. For example, the lower limit of the volume resistivity is approximately 0.001 ohm-cm when the dopant is arsenic.

The substrate plate of silicon in the inventive method can be single-crystalline, polycrystalline or amorphous but use of a single crystal silicon is preferable in respect of the higher smoothness of the substrate surface than with other types. The method for the preparation of silicon substrates is not particularly limitative including those conventionally used in the preparation of a single crystal silicon rod as a material of semiconductor devices and solar cells but a single crystal silicon rod is prepared preferably by the Czochralski method because this method is suitable for the preparation of a single crystal silicon rod having a large diameter. The single crystal silicon for the preparation of the silicon substrate plate of a magnetic recording medium should be as free as possible from defects such as slips, dislocations, stratification failures, oxidized precipitates and the like as well as pinholes because a decrease is caused thereby in the mechanical strength and surface smoothness of the silicon substrate plate. The surface roughness of the silicon substrate plate should desirably be as low as possible in order to ensure a very small flying height of the magnetic head during recording and playing-back of signals although too fine or too smooth surface is accompanied by another problem in the CSS characteristics. The surface roughness given by the maximum value Rmax should not exceed 20 nm or, preferably, should not exceed 10 nm.

The crystallographic orientation of the single-crystal silicon substrate plate is not particularly limitative including (100), (111) and (110) for the flat surface of the substrate plate as well as any intermediate crystallographic orientations with a deviation from the above mentioned orientations.

Excepting for the use of the above defined specific silicon substrate plate, the magnetic recording medium according to the invention can be prepared in a conventional manner by forming an underlayer, magnetic recording layer and protective layer successively on at least one surface of the substrate plate each by using a conventional material for the respective layers. For example, the underlayer is formed from chromium or a chromium-based alloy. The magnetic recording layer is formed from a cobalt-based alloy such as cobalt-chromium-tantalum alloys, cobalt-chromium-nickel alloys, cobalt-platinum-chromium alloys, cobalt-platinum-chromium-tantalum alloys and cobalt-platinum-chromium-boron alloys as well as certain iron-based alloys. The material of the protective layer can be carbon or silicon dioxide though not particularly limitative thereto. The method for the formation of each of these layers is preferably a dry-process method such as sputtering in respect of the good uniformity and controllability of the thickness of the layers even when the thickness is very small. In particular, formation of the magnetic recording layer is performed by the so-called bias-sputtering method, in which the substrate plate is kept at a negative potential by applying a negative voltage of, preferably, −100 volts to −500 volts relative to the ground or the body of the sputtering chamber so that the improvement obtained according to the invention is more remarkable to give a higher coercive force of the magnetic recording layer.

Besides the above described unique feature of the invention for the use of a very specific silicon substrate plate in the preparation of a magnetic recording medium, it has been unexpectedly discovered that another very important factor which has influences on the coercive force of the magnetic recording layer formed on the substrate surface is the contact resistance between the silicon substrate plate and the substrate holder in conducting the bias-sputtering method. Namely, it is desirable in the invention that the contact resistance between the silicon substrate plate and the substrate holder in conducting the bias-sputtering method should be kept not to exceed 10 kohm or, preferably, 1 kohm or, more preferably, 100 ohm.

The contact resistance is a non-ohmic resistance depending on various factors such as the material and resistivity of the substrate holder, kind and concentration of the dopant in the silicon substrate plate, shapes of the contacting surfaces, contacting area, contacting pressure and so on. The substrate holder is prepared from an electrically conductive material such as metals and alloys, e.g., stainless steels and aluminum alloys. The contact resistance may be affected by the bias voltage. Accordingly, the contact resistance is determined by applying a voltage equal to the bias voltage in the bias-sputtering process to the silicon substrate. Incidentally, the substrate holder here implied includes not only the members which actually hold the silicon substrate plate but also any other metallic parts in contact with the substrate during the bias-sputtering process for the formation of the magnetic recording layer.

In the following, the improvement accomplished by the present invention is described in more detail by way of examples and comparative examples.

EXAMPLE 1

A boron-doped single crystal silicon rod having a volume resistivity of 0.1 ohm.cm at room temperature as grown by the Czochralski method in the crystallographic axial direction of <100> was sliced into a wafer, which was, after lapping on the surface, provided with a center opening by using a core drill to give an annular single crystal silicon disc having an outer diameter of 65 ram, inner diameter of 20 mm and thickness of 0.685 min. Thereafter, the surface of this annular silicon disc was mechanochemically polished by using a colloidal silica to be imparted with a surface roughness Rmax of 6 nm to be suitable for use as a substrate plate of a magnetic recording medium.

The thus prepared silicon substrate plate was provided by the method of DC bias-sputtering successively with layers including, firstly, an underlayer of chromium having a thickness of 100 nm, secondly, a magnetic recording layer of $Co_{86}Cr_{12}Ta_2$ alloy having a thickness of 60 nm and, thirdly, a protective layer of car-bon having a thickness of 30 nm. The conditions of the DC bias-sputtering include 300° C. of the substrate temperature, atmosphere of argon under a pressure of 20 mTorr, bias voltage of −250 volts and cathode voltage, i.e. target voltage of 500 volts. The contact resistance between the silicon substrate plate and the substrate holder during the process of sputtering for the formation of the magnetic recording layer was estimated to be 520 ohm.

The thus prepared magnetic recording medium was subjected to the measurement of the coercive force of the magnetic recording layer for 10 mm by 10 mm square test pieces taken therefrom by cutting on a vibration-sample magnetometer by applying a magnetic field of 10 kOe maximum to find that the coercive force of the magnetic recording layer was 1490 Oe.

EXAMPLE 2

The experimental procedure was substantially the same as in Example 1 excepting the use of a substrate plate which was an arsenic-doped single crystal silicon plate having a volume resistivity of 0.01 ohm-cm at room temperature to find a coercive force of the magnetic recording layer of 1640 Oe. The contact resistance between the silicon substrate plate and the substrate holder during the process of sputtering for the formation of the magnetic recording layer was estimated to be 80 ohm.

EXAMPLE 3

The experimental procedure was substantially the same as in Example 1 excepting the use of a substrate plate which was a phosphorus-doped single crystal silicon plate having a volume resistivity of 1 ohm.cm at room temperature to find a coercive force of the magnetic recording layer of 1410 Oe. The contact resistance between the silicon substrate plate and the substrate holder during the process of sputtering for the formation of the magnetic recording layer was estimated to be 830 ohm.

Comparative Example 1

The experimental procedure was substantially the same as in Example 1 excepting the use of a substrate plate which was a boron-doped single crystal silicon plate having a volume resistivity of 10 ohm.cm at room temperature to find a coercive force of the magnetic recording layer of 1280 Oe. The contact resistance between the silicon substrate plate and the substrate holder during the process of sputtering for the formation of the magnetic recording layer was estimated to be 23 kohm,

Comparative Example 2

The experimental procedure was substantially the same as in Example 1 excepting the use of a substrate plate which was a phosphorus-doped single crystal silicon plate having a volume resistivity of 3 ohm.cm at room temperature to find a coercive force of the magnetic recording layer of 1270 Oe. The contact resistance between the silicon substrate plate and the substrate holder during the process of sputtering for the formation of the magnetic recording layer was estimated to be 19 kohm.

EXAMPLE 4

The experimental procedure was substantially the same as in Example 1 excepting the use of a substrate plate which was a boron-doped single crystal silicon plate having a volume resistivity of 0.05 ohm.cm at room temperature to find a coercive force of the magnetic recording layer of 1560 Oe. The contact resistance between the silicon substrate plate and the substrate holder during the process of sputtering for the formation of the magnetic recording layer was estimated to be 130 ohm.)

What is claimed is:

1. In a method for the preparation of a magnetic according medium comprising a non-magnetic substrate plate of silicon and a magnetic recording layer of a ferromagnetic material formed by the method of bias-sputtering on at least one fl3 at surface of the substrate plate held by a substrate holder in a sputtering chamber, the improvement which comprises using a substrate plate of silicon of which the volume resistivity does not exceed 0.02 ohm.cm at room temperature.

2. In a method for the preparation of a magnetic recording medium comprising a non-magnetic substrate plate of silicon and a magnetic recording layer of a ferromagnetic material formed by the method of bias-sputtering on at least one flat surface of the substrate plate held by a substrate holder in a sputtering chamber, the improvement which comprises keeping the contact resistance between the substrate plate and the substrate holder during the bias-sputtering for the formation of the magnetic recording layer on the substrate surface not to exceed 10 kohm.

3. The improvement as claimed in claim 2 in which the contact resistance between the substrate plate and the substrate holder during the bias-sputtering for the formation of the magnetic recording layer on the substrate surface does not exceed 1 kohm.

4. The improvement as claimed in claim 2 in which the contact resistance between the substrate plate and the substrate holder during the bias-sputtering for the formation of the magnetic recording layer on the substrate surface does not exceed 100 ohm.

* * * * *